United States Patent
Martin et al.

(10) Patent No.: US 6,531,217 B1
(45) Date of Patent: Mar. 11, 2003

(54) POLYMER FILAMENTS USED AS A THERMOLUMINESCENT DOSIMETER

(75) Inventors: Stéphane Martin, La Rochelle (FR); Manuel Bardies, Bouguenais (FR); Albert Lisbona, Saint Herblain (FR); Sophie Morteau, Angers (FR); Joël Richard, Blou (FR); Jean-Pierre Benoit, Avrille (FR); Benoit Denizot, Angers (FR)

(73) Assignees: Mainelab, Angers (FR); Universite d'Angers, Angers (FR)

(*) Notice: Subject to any disclaimer, the term of this patent is extended or adjusted under 35 U.S.C. 154(b) by 0 days.

(21) Appl. No.: 09/937,285
(22) PCT Filed: Mar. 24, 2000
(86) PCT No.: PCT/FR00/00745
§ 371 (c)(1),
(2), (4) Date: Mar. 4, 2002
(87) PCT Pub. No.: WO00/58755
PCT Pub. Date: Oct. 5, 2000

(30) Foreign Application Priority Data

Mar. 25, 1999 (FR) .............................................. 99 03729

(51) Int. Cl.$^7$ ................................................ D01F 6/00
(52) U.S. Cl. ........................................ 428/364; 428/372
(58) Field of Search ................................... 428/364, 372

(56) References Cited

U.S. PATENT DOCUMENTS 4,522,868 A * 6/1985 Ohuchi et al. .............. 428/224

* cited by examiner

Primary Examiner—N. Edwards
(74) Attorney, Agent, or Firm—Foley & Lardner

(57) ABSTRACT

The invention relates to a filament comprising thermoluminescent particles that are evenly distributed in a polymer matrix, characterized in that the polymer matrix is a thermoplastic polymer having sufficient adhesion with respect to said thermoluminescent particles in order to ensure the cohesion of said filament and being such that the thermoluminescent response (signal) of the filament corresponds substantially to the dose of radiation absorbed and obtained after the filament is placed in contact with a physiological medium. The invention also relates to a method for thermoluminescence-based measurement of doses of beta radiation delivered by a transmitter on a target organ of a mammal, characterized in that a group of inventive filaments is introduced to the desired spot, whereby part of the length of said filaments remains outside the irradiated area, and in that the filaments are removed after irradiation and thermoluminescence is determined.

17 Claims, 1 Drawing Sheet

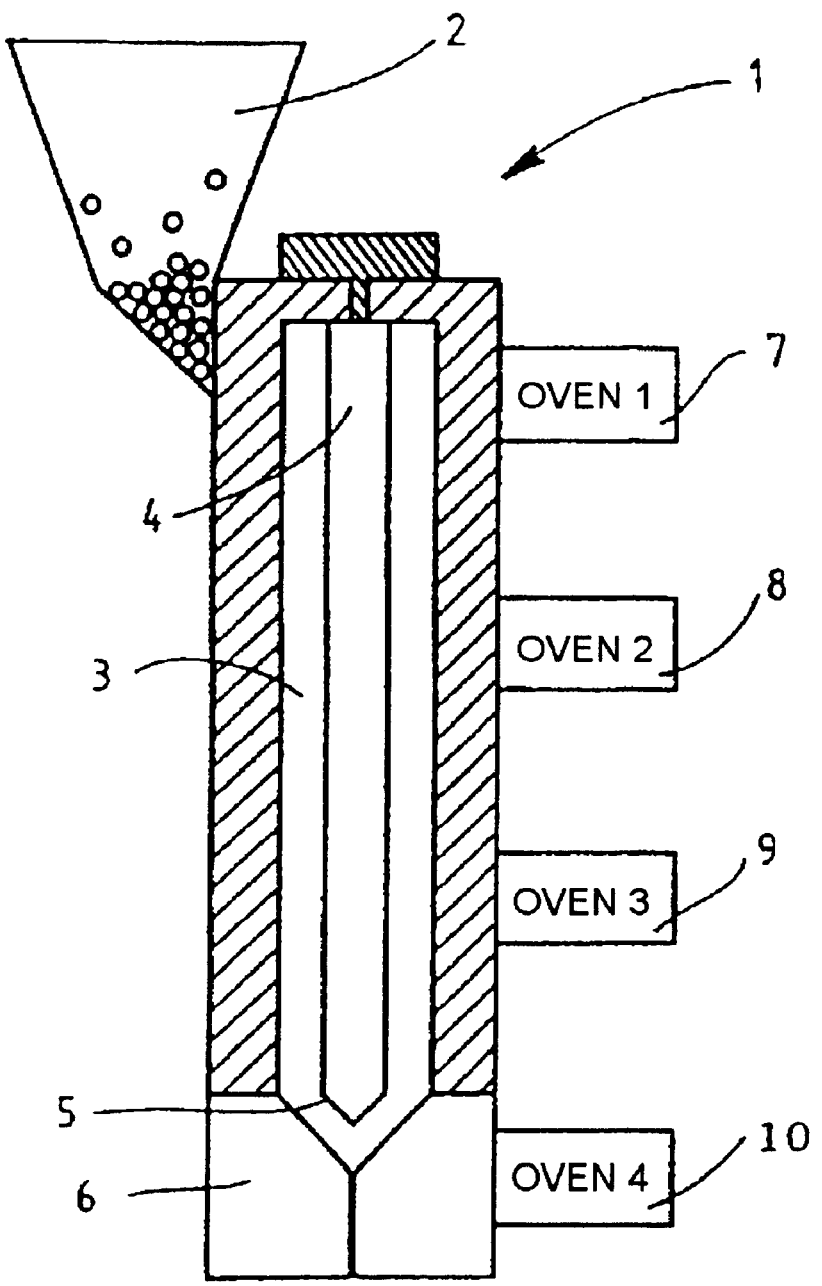

POLYMER FILAMENTS USED AS A THERMOLUMINESCENT DOSIMETER

The present invention relates to novel filaments formed from a polymer matrix and from thermoluminescent particles, especially for use as thermoluminescent dosimeters.

It also relates to a method for measuring, by thermoluminescence, the beta radiation doses delivered by an emitter to a target organ of a mammal.

The use of thermoluminescent dosimeters has already been described in internal radiotherapy in patent FR-B-1 470 914.

This patent describes especially polytetrafluoroethylene (PTFE) filaments about 1 mm in diameter, these being filled to about 8% with lithium fluoride microcrystals obtained by extrusion and able to be used in vivo.

Lithium fluoride forms part of the thermoluminescent mineral compounds called "phosphors", among which mention may also be made of calcium fluoride $CaF_2$ or calcium sulfate $CaSO_4$, to which special activators may possibly be added.

Implantable $Dy:CaSO_4$ mini-dosimeters (B. W. Wessels et al., The Journal of Medicine, Vol. 27, No. 8, August 1986, pp. 1308–1314) have in particular been manufactured by cutting disks of Teflon and $CaSO_4$ with a microtome.

The small dimensions (0.5×0.2×0.4 mm) of these osimeters make it possible to detect large dose gradients during the therapeutic use of beta-emitting radioelements.

Many subsequent studies have been carried out using these $Dy:CaSO_4$ mini-thermoluminescent dosimeters (mini-TLDs). Thus, S-E Strand et al., (Acta Oncologica, Vol. 32, No. 718, pp. 787–791, 1993) have demonstrated the phenomenon of $Dy:CaSO_4$ crystals dissolving in aqueous phase. This leads to a loss of signal in vivo (by 60% for immersion for 9 days at pH 6) making the luminescence measurements at the very least inaccurate. These authors propose covering the dosimeter with a thin layer of Teflon or with other suitable materials.

A. J. Demidecki et al., Med. Phys. 20:1079:1087, 1993 concluded that there was a great difficulty in using $Dy:CaSO_4$ mini-TLDs unless correction factors were applied.

Many subsequent studies have been carried out using these $Dy:CaSO_4$ mini-thermoluminescent dosimeters (mini-TLDs). Thus, S-E Strand et al., (Acta Oncologica, Vol. 32, No. 718, pp. 787–791, 1993) have demonstrated the phenomenon of $Dy:CaSO_4$ crystals dissolving in aqueous phase. This leads to a loss of signal in vivo (by 60% for immersion for 9 days at pH 6) making the luminescence measurements at the very least inaccurate. These authors propose covering the dosimeter with a thin layer of Teflon or with other suitable materials.

A. J. Demidecki et al., Med. Phys. 20:1079:1087, 1993 concluded that there was a great difficulty in using $Dy:CaSO_4$ mini-TLDs unless correction factors were applied.

However, mini-dosimeters have been used in vivo by M. H. Griffith et al., J. Nucl. Med. 1988, 29:1795–1809.

Nevertheless, it is desirable to provide novel mini-thermoluminescent dosimeters which do not have the above-mentioned disadvantages, especially in the case of in vivo use.

Unexpectedly, the applicants have shown that improving the adhesion properties between the polymer material and the thermoluminescent particles helps to overcome the drawbacks described above.

It is an object of the present invention to provide novel filaments which can be used in particular to make mini-thermoluminescent dosimeters which:

exhibit excellent mechanical strength and excellent elasticity within the context of in vivo use;

provide effective protection of the TL crystals from an aqueous medium;

show a lack of exchange between content and container (dissolution, chemical reaction);

exhibit satisfactory biocompatibility with tissue;

allow the absorbed radiation dose from a few mGy to a few tens of Gy to be determined with improved accuracy;

have an advantageous manufacturing cost.

One or more of the objects of the invention are achieved by the solution that the patent application provides.

The invention therefore relates to a filament comprising thermoluminescent particles uniformly distributed in a polymer matrix, characterized in that the polymer matrix coating said thermoluminescent particles is a hydrophobic thermoplastic polymer having sufficient adhesion to the thermoluminescent particles to ensure cohesion of the filament and being such that a thermoluminescent response (signal) from the filament corresponding approximately to the absorbed radiation dose is obtained, after the filament has been brought into contact with a physiological medium.

The polymer is therefore such that, after the filament has been immersed in an irradiation physiological medium, the thermoluminescent response (signal) corresponds approximately to the absorbed radiation dose.

The term "polymer" is understood to mean within the context of the present description a homopolymer, a copolymer, a blend of homopolymers or a blend of copolymers.

The term "sufficient adhesion" is understood to mean that the polymer has a high surface energy, however not exceeding the surface energy of a hydrophilic polymer. PTFE, for example, known for its nonstick properties, has a very low surface energy (its surface energy is 21 mJ/m$^2$ at 20° C.). The surface energy of the polymer allowing the invention to be implemented advantageously lies between 25 and 50 mJ/m$^2$ at 20° C. and advantageously between 27 and 46 mJ/m$^2$. The expression "corresponding approximately" is understood to mean that the response must be at least of the order of 90% with respect to the absorbed dose. That is to say, the response is not affected by prolonged residence of the filament in the physiological medium. In other words, the filament behaves equivalently in air and when it is immersed in a physiological medium. There is practically no loss of response due to immersion in a physiological medium.

The expression "good cohesion" is understood to mean that the filament has a high mechanical strength and retains its physical integrity in a physiological medium.

The thermoluminescent particles are formed from crystals which, after irradiation, have the property of releasing the absorbed energy in the form of light when they are subjected to a sufficiently high temperature. There is storage of the ionization phenomena. The amount of light emitted is then, within certain limits, a linear function of the dose absorbed by the crystal. They can therefore be used as dosimeters. All luminescent particles in powder form may be suitable.

There are a large number of thermoluminescent particles known to those skilled in the art.

Among thermoluminescent particles, mention may especially be made of crystals based on lithium fluoride (LiF), calcium fluoride (CaF$_2$), these possibly being doped with magnesium, copper or phosphorus.

Among polymers which are suitable within the context of the present invention, it is preferred to use those which can be processed using well-known extrusion processes. These polymers must therefore have a melting point below the critical temperature of the thermoluminescent particles so as not to degrade the dosimetric characteristics of the TL material. However, it should be noted that some thermoluminescent materials have a sufficiently high critical temperature for this proviso to be unnecessary (the critical "temperature" is the limit above which the thermoluminescent material loses its properties of releasing the stored energy).

Among thermoplastic polymers meeting this requirement, mention may be made of nonhalogenated polyolefins, especially polyethylenes, polypropylenes or polyisobutylenes. Among polyethylenes, mention may be made of low-density polyethylenes (LDPEs) or high-density polyethylenes (HDPEs). Polypropylenes have a better mechanical strength than polyethylenes and have a higher melting point.

Among the other extrudable polymers, mention may be made of (co)polymers resulting from the polymerization of vinyl chloride (PVC), acrylic and methacrylic ester polymers, such as polymethyl methacrylate (PMMA), or other equivalent polymers, polystyrenes, polyethylene terephthalates, polyamides and ethylene-vinyl acetate copolymers.

Of course, other polymers able to be processed by extrusion are also suitable.

Preferably, the filaments are obtained by extrusion, that is to say the mixture of thermoluminescent particles in powder form and of polymers in granule or powder form is introduced into the hopper of an extruder, homogenized in a suitable temperature gradient in a barrel provided with an extrusion screw, before being passed through a die of defined diameter.

To obtain good-quality filaments, it will often be required to add, in a known manner, lubricants to the mixture of granules and particles.

The subject of the invention is more particularly micrometric filaments, that is to say filaments whose diameter is less than 1 mm, preferably between 100 and 800 micrometers. In practice in this case, simple extrusion of a mixture of particles and granules without any preparation is not very easy. In order to improve the extrusion, for example for a die 400 micrometers in diameter, it is advantageous to use thermoluminescent particles whose particle size is small. Of course, the particle size depends on the nature of these particles. In general, it is preferred to use particles whose size is less than 90 micrometers, thereby making extrusion more uniform. In addition, the surface finish of the filaments is improved by the use of an internal lubricant (for example, a polyethylene wax or polypropylene wax) and an external lubricant (as antistatic agent) in order to prevent the formation of aggregates.

Preferably, the thermoluminescent particles are present in a proportion of between 10 and 50% by weight with respect to the weight of the filament. Advantageously, the proportion is greater than 25% by weight.

This is because it has been noted that the greater the proportion of particles the smaller the coefficient of variation of the measurements (standard deviation with respect to the mean over ten measurements). Consequently, a high proportion of particles makes it possible to combine the two advantages relating to sensitivity and repeatability of the measurements within the same batch.

The irradiation doses may vary over a very wide range, from a few mGy to 20 Gy, it being possible, of course, for this range of values to vary depending on the nature of the thermoluminescent particles.

After irradiation, reading is carried out in a suitable reader known to those skilled in the art. The heating is carried out by conduction and an optical detection system is used to collect the signal emitted by the thermoluminescent material during heating. This reading is destructive if the polymer matrix has a melting point below the heating temperature, that is to say the dosimeter is a "single use" dosimeter.

Care must be taken, as an additional criterion in respect of the choice of polymer, to ensure that, during reading, the melting of the polymer does not disturb the recorded signal and does not damage the TL reader.

According to another variant, the filament includes an external layer or sheath formed from a hydrophobic thermoplastic polymer alone (without any TL powder), the melting point of which is below the critical temperature of the thermoluminescent particles, and the core is a filament as described above. Preferably, the polymer of the external layer is identical to the polymer matrix. The thickness of the external layer is such that the diameter of the core filament plus the external layer is less than 800 µm.

It will be advantageous to coextrude the external layer in the presence of an external lubricant (polyethylene wax or polypropylene wax, for example). The coextrusion is carried out using the techniques known in the art.

The filaments according to the invention are particularly noteworthy in that they have a very homogeneous distribution of the thermoluminescent particles and in that they provide excellent protection of said thermoluminescent particles against an external medium.

It should in particular be noted that these filaments can be stored in air, or exhibit no degradation in an aqueous medium at variable pH.

It is for this reason that these filaments are advantageously used in vivo so as to determine the dose received by a mammal's target organ to be treated.

This is why the invention relates to a filament as described above for measuring in vivo, by thermoluminescence, the beta or gamma radiation doses delivered by an emitter in a target organ of a mammal.

The invention also relates to a method for measuring, by thermoluminescence, the beta radiation doses delivered by an emitter in a target organ of a mammal, characterized in that a group of filaments according to the invention is introduced at the desired location, it being possible for part of the length of said filaments to remain outside the irradiated zone, and in that, after irradiation, the filaments are removed and the thermoluminescence determined.

The invention will now be illustrated by the following examples:

ILLUSTRATIVE EXAMPLES

Filaments were manufactured by extrusion in an extruder, shown in the single FIGURE (schematic cross section), known per se:

The extruder 1 comprised a filling hopper 2 emerging in an internal volume 3 of cylindrical shape in which an extrusion screw 4 was concentrically fixed, the lower end 5 of which screw being opposite an extrusion die 6 having a diameter of 400 µm. Ovens, four in number (7, 8, 9, 10), were placed regularly along the extruder.

The extruder was connected to an electrical control box for controlling the heating parameters and the speed of the extrusion screw.

The thermoluminescent material was lithium fluoride doped with magnesium, copper and phosphorus (in powder form) described by T. Nakajima et al., Health Phys. 14–266, 1978. The Mg,Cu,P:LiF has a number $Z_{eff}$ close to that of tissue of about 7.4.

After the powder has been ground, a batch with a particle size of between 0 and 90 µm was recovered. The polymer was polypropylene of 0.907 density and 165° C. melting point or polyethylene of 0.916 density and 105° C. melting point.

The raw material resulting from mixing the LiF with the polymer in powder or granule form was introduced into the hopper at the end of the screw, which rotated in a barrel subjected to a temperature gradient. The temperature of the material increased and the granules were gradually converted into a molten mass. The plasticized material penetrated a channel which progressively changed in cross section before reaching the die. The extrusion screw exerted a pressure (depending on the speed) which expelled the molten mixture through this die.

The surface finish of the yarns was improved by the use of an external lubricant (a polyethylene wax or polypropylene wax) and of an internal lubricant (antistatic agent) in order to prevent the formation of Mg,Cu,P:LiF aggregates.

EXAMPLE 1

The following mixture was produced:

| | |
|---|---|
| • Mg,Cu,P:LiF | 50 wt% |
| • Polypropylene (PYO787F, Plast Labor S.A., Switzerland) | 38 wt% |
| • External lubricant (VESTOWAX P930, Hüls, Germany) | 10 wt% |
| • Internal lubricant (LANKROSTAT 126, Akros, The Netherlands) | 2 wt% |

EXAMPLE 2

The following mixture was produced:

| | |
|---|---|
| • Mg,Cu,P:LiF | 30 wt% |
| • Polypropylene (op. cit.) | 58 wt% |
| • External lubricant (op. cit.) | 10 wt% |
| • Internal lubricant (op. cit.) | 2 wt% |

In these examples, the parameters displayed in the control box of the extruder were determined by experiment, for the purpose of obtaining the most uniform possible extrudate. The ovens 7 to 10 were set at the respective temperatures of 135, 160, 175 and 180° C. The speed of the screw was 30 revolutions per minute.

The extrudate was recovered in the form of filament 500 µm in cross section and of variable length. It was then possible to cut this yarn to the desired length.

EXAMPLE 3

The following mixture was produced:

| | |
|---|---|
| • Mg,Cu,P:LiF | 10 wt% |
| • Polypropylene (op. cit.) | 78 wt% |
| • External lubricant (op. cit.) | 10 wt% |
| • Internal lubricant (op. cit.) | 2 wt% |

The extrusion temperatures of the ovens 7 to 10 were the following: 135, 160, 175 and 180° C. and the speed of the screw was 30 revolutions per minute.

EXAMPLE 4

The following mixture was produced:

| | |
|---|---|
| • Mg,Cu,P:LiF | 50 wt% |
| • Polyethylene (HP 1681, Plast Labor S.A., Switzerland) | 38 wt% |
| • External lubricant (op. cit.) | 10 wt% |
| • Internal lubricant (op. cit.) | 2 wt% |

The extrusion temperatures of the ovens 7 to 10 were the following: 95, 110, 130 and 145° C. and the speed of the screw was 30 revolutions per minute.

EXAMPLE 5

Irradiation

Filaments 5 cm in length obtained from examples 1, 2 and 3, respectively, namely filaments 1, 2 and 3, were irradiated with Cobalt 60 to 1 Gy in a suitable Plexiglas phantom, under electronic equilibrium conditions. The mini-dosimeters were then weighed so as to linearly correct the thermoluminescent signal by the mass of each dosimeter. This linear correction is based on the assumption that the distribution of the TL powder within the dosimeter is homogenous.

The dosimeters thus manufactured were read with a manual reader according to the same heating law as the powder.

EXAMPLE 6

Reading

Each filament was then cut at the time of reading into 10 mini-dosimeters 5 mm in length. The standard deviation of these 10 measurements is an indicator of the homogeneity of the response (TL) observed on a 5 cm filament.

The reading was carried out by means of a thermoluminescent reader essentially comprising:

a heating system;

an optical detection system;

an associated data processing system.

The heating was carried out by conduction. The temperature was set to 240° C. The TL signal was then determined.

The results obtained with filaments 1, 2 and 3 are given below:

| Filaments | Mean coefficient of variation |
|---|---|
| 1 | 2.9% |
| 2 | 5.2% |
| 3 | 7.8% |

If all the dosimeters over 50 cm (i.e. 100 dosimeters) are considered, a TL response homogeneity to within ±4.2% (±a standard deviation) is observed. These handling operations show that the miniature thermoluminescent dosimeters manufactured by microextrusion exhibit good manufacturing homogeneity, this being characterized by reproducible operation when they are employed in high-energy external beams (cobalt 60). They can therefore be used with good accuracy.

EXAMPLE 7

Response as a Function of Irradiation Dose

Filaments 1 were irradiated with cobalt 60, in a suitable Plexiglas phantom, under electronic equilibrium conditions for increasing doses of 0.10 Gy, 0.25 Gy, 0.5 Gy, 1 Gy, 2 Gy, 4 Gy, 6 Gy, 8 Gy, 10 Gy, 15 Gy and 20 Gy. The thermoluminescent response was linear up to 10 Gy. Above this, the response was sublinear, but did not reach saturation until at least 20 Gy. By correlating the background noise signal with the corresponding absorbed dose, an absorbed dose of 0.0017 Gy was obtained. The smallest measurable dose was therefore 3×0.0017 Gy, i.e. 5.1 mGy +4.7%.

EXAMPLE 8

Stability of the Response of Filaments 1 in Air

Six mini-filaments 1, 10 cm in length, were irradiated with cobalt 60 to 1 Gy in a suitable Plexiglas phantom under electronic conditions. After the irradiation, each filament was cut into two parts 5 cm in length. One of these parts was read immediately and the other was stored in air, at room temperature, for variable times of 1 day, 2 days, 4 days, 7 days, 9 days and 15 days.

The Mg,Cu,P:LiF mini-dosimeters showed no attenuation (fading) of the signal in air over a period ranging up to 15 days. Mg,Cu,P:LiF is a very stable material in air. In the form of mini-dosimeters, this quality is again found and the thermoluminescent material is not modified by the process for preparing the filaments.

EXAMPLE 9

Behavior of the Mini-dosimeters in Water

Six filaments 1, 10 cm in length, were cut into two parts 5 cm in length. One of these parts was kept dry (the standard) and the other was immersed in water at room temperature. The dosimeters were collected at t=1 day, t=2 days, t=4 days, t=7 days, t=9 days and t=15 days, dried and then irradiated with cobalt 60 to 1 Gy in a Plexiglas phantom under electronic equilibrium conditions. At reading, the deviation between the signal from the immersed dosimeters and the signal from the standard dosimeters is an indicator of the stability of the mini-dosimeters in water and therefore of the effectiveness of the encapsulation. The same experiment was carried out in water at 37° in order to be closer to the conditions in use.

It was found that the Mg,Cu,P:LiF mini-dosimeters had excellent physicochemical stability in water (no dissolution) up to at least 15 days' immersion, since no reduction in the sensitivity could be observed.

EXAMPLE 10

Influence of the pH on the Thermoluminescent Signal of the Mini-dosimeters

It is necessary to check whether the pH of the medium has an effect on the TL signal of the dosimeters. Where appropriate, it will be necessary, during calibration, to take into account the pH of the medium in which the measurement is carried out. To do this, 4 solutions of pH 4, 6, 8 and 10 were produced. These solutions were obtained from $Na_2HPO_4$ (base) and $NaH_2PO_4$ (acid). NaOH and HCl solutions were used for precise adjustment of the pH.

To evaluate the change in the TL signal as a function of the immersion time of the dosimeters, 12 filaments 1, 5 cm in length, were placed in four solutions at pH 4, 6, 8 and 10, with three yarns per solution. Three yarns were kept in air as standards. One yarn per solution was removed after 1 day, 3 days and 7 days of immersion. The dosimeters were then cleaned, irradiated with cobalt 60 (1 Gy) and then read with a manual reader at the same time as the standard dosimeters. This study therefore made it possible to check simultaneously the variation in the TL signal as a function of the pH of the solution (for a fixed immersion time).

The results show that the behavior of the Mg,Cu,P:LiF mini-dosimeters is stable in acid and basic aqueous solutions over an immersion period of at least 7 days:

|  | 1 day | 3 days | 7 days |
|---|---|---|---|
| pH = 4 | 1 ± 0.05 | 0.95 ± 0.04 | 0.99 ± 0.03 |
| pH = 6 | 0.96 ± 0.04 | 0.99 ± 0.02 | 0.99 ± 0.03 |
| pH = 8 | 1.00 ± 0.05 | 0.98 ± 0.02 | 0.97 ± 0.05 |
| pH = 10 | 0.98 + 0.05 | 0.96 ± 0.02 | 1.00 ± 0.06 |

Stability of the TL signal in solutions of variable pH

EXAMPLE 11

Preparation of TL Mini-dosimeters by Coextrusion

A coextruded filament was manufactured by means of a coextruder known per se. As in the embodiment described previously, a mixture of Mg,Cu,P:LiF (30%), polypropylene (58%), external lubricant (10%) and internal lubricant (2%) was introduced into an upper hopper. The Mg,Cu,P:LiF powder was preground and screened in order to have a size of between 0 and 50 $\mu$m. This mixture was forced, by means of an extrusion screw (screw No. 1) through the 400 $\mu$m diameter extrusion die and then the extruded filament (core) ran into a coextrusion die communicating with a second, lateral hopper allowing polypropylene granules to be introduced. The polymer forced through the coextrusion die by means of a second screw (screw No. 2) formed a sheath around the core inside the chamber. The combination was coextruded through an 800 $\mu$m diameter die. The temperatures of the four ovens were, in the case of screw No. 1 from the top down: 120, 135, 160 and 175° C. and, in the case of screw No. 2: 120, 140, 165 and 175° C., respectively.

The coextruded filament thus formed was then tested under the conditions indicated above.

The results show that the behavior of the Mg,Cu,P:LiF mini-dosimeters is stable in acid and basic aqueous solutions over an immersion period of at least 7 days.

What is claimed is:

1. A filament comprising thermoluminescent particles uniformly distributed in a polymer matrix,
   a hydrophobic thermoplastic polymer having sufficient adhesion to the thermoluminescent particles to ensure cohesion of the filament and being such that a thermoluminescent response (signal) from the filament corresponding approximately to the absorbed radiation dose is obtained, after the filament has been brought into contact with a physiological medium, and
   a lubricant.

2. The filament as claimed in claim 1, wherein the thermoluminescent particles are present in the filament in a proportion of between 10 and 50% by weight with respect to the filament.

3. The filament as claimed in claim 1, wherein the polymer has a melting point below the critical temperature of the thermoluminescent particles.

4. The filament as claimed in claim 1, wherein the surface energy of the polymer is between 25 and 50 $mJ/m^2$ at 20° C.

5. The filament as claimed in claim 4, wherein the polymer is chosen from the group consisting of nonhalogenated polyolefins, polyvinyl chlorides, acrylic and methacrylic ester polymers, polystyrenes, polyethylene terephthalates, polyamides and ethylene-vinylacetate copolymers.

6. The filament as claimed in claim 1, wherein the thermoluminescent particles are microcrystals having a size of less than or equal to 90 µm.

7. The filament as claimed in claim 1, wherein the thermoluminescent particles comprise lithium fluoride.

8. The filament as claimed in claim 1, wherein the filament has a diameter of between 100 and 800 µm.

9. The filament as claimed in claim 1, wherein the filament is obtained by extrusion. extrusion.

10. A filament comprising an external layer or sheath formed from a thermoplastic polymer whose melting point is below the critical temperature of the thermoluminescent particles and a core consisting of a filament as claimed in claim 1.

11. Use in vivo of a filament as claimed in claim 1, in the target organ of a mammal, especially man, as thermoluminescent dosimeter.

12. The filament as claimed in claim 10, wherein the core includes an internal lubricant which is a nonhalogenated polyolefin wax, and the external layer also contains a lubricant.

13. The filament as claimed in claim 1, wherein the thermoluminescent particles comprise Mg,Cu,P:LiF.

14. The filament as claimed in claim 4, wherein the polymer is a nonhalogenated polyolefins selected from the group consisting of polypropylenes, poyethylenes, and a blend of polypropylenes and poyethylenes.

15. The filament as claimed in claim 12, wherein the nonhalogenated polyolefin wax is selected from the group consisting of polypropylene wax and polyethylene wax.

16. The filament as claimed in claim 1, wherein the thermoluminescent particles are present in the filament in a proportion of between 25 and 50% by weight with respect to the filament.

17. The filament as claimed in claim 1, wherein the surface energy of the polymer is between 27 and 46 $mJ/m^2$ at 20° C.

* * * * *

UNITED STATES PATENT AND TRADEMARK OFFICE
CERTIFICATE OF CORRECTION

PATENT NO.    : 6,531,217 B1
DATED         : March 11, 2003
INVENTOR(S)   : Stephane Martin et al.

It is certified that error appears in the above-identified patent and that said Letters Patent is hereby corrected as shown below:

Column 1,
Line 27, delete "osimeters" and insert -- dosimeters --.

Column 10,
Line 2, delete second occurrence of "extrusion".

Signed and Sealed this

Eighteenth Day of May, 2004

JON W. DUDAS
*Acting Director of the United States Patent and Trademark Office*